(12) United States Patent
Mimatsu et al.

(10) Patent No.: US 7,895,287 B2
(45) Date of Patent: *Feb. 22, 2011

(54) CLUSTERED STORAGE SYSTEM WITH EXTERNAL STORAGE SYSTEMS

(75) Inventors: Yasuyuki Mimatsu, Cupertino, CA (US); Shoji Kodama, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 11/969,487

(22) Filed: Jan. 4, 2008

(65) Prior Publication Data

US 2008/0104193 A1 May 1, 2008

Related U.S. Application Data

(63) Continuation of application No. 11/055,011, filed on Feb. 9, 2005, now Pat. No. 7,337,350.

(51) Int. Cl.
*G06F 15/167* (2006.01)
*G06F 13/00* (2006.01)

(52) U.S. Cl. ...................... 709/215; 711/100

(58) Field of Classification Search ............ 709/215; 707/10; 711/100, 113, 122; 714/4, 5
See application file for complete search history.

(56) References Cited

U.S. PATENT DOCUMENTS

| | | | | |
|---|---|---|---|---|
| 5,781,716 A * | 7/1998 | Hemphill et al. | ............ | 714/4 |
| 5,941,999 A * | 8/1999 | Matena et al. | ............ | 714/6 |
| 5,974,508 A * | 10/1999 | Maheshwari | ............ | 711/133 |
| 6,308,284 B1 * | 10/2001 | LeCrone et al. | ............ | 714/6 |
| 6,529,976 B1 | 3/2003 | Fukuzawa et al. | | |
| 6,550,017 B1 * | 4/2003 | Moiin et al. | ............ | 714/4 |
| 6,928,577 B2 * | 8/2005 | Moser et al. | ............ | 714/4 |
| 6,983,396 B2 * | 1/2006 | Brant et al. | ............ | 714/6 |
| 7,058,731 B2 | 6/2006 | Kodama | | |
| 7,058,848 B2 * | 6/2006 | Sicola et al. | ............ | 714/4 |
| 7,111,189 B1 * | 9/2006 | Sicola et al. | ............ | 714/6 |
| 7,219,122 B1 * | 5/2007 | Pena-Mora et al. | ......... | 709/201 |

(Continued)

*Primary Examiner*—Ario Etienne
*Assistant Examiner*—Sargon N Nano
(74) *Attorney, Agent, or Firm*—Mattingly & Malur, P.C.

(57) ABSTRACT

A data storage system comprises a first platform storage system including a first network interface to communicate with a host computer, a first storage unit to provide storage volumes, a first storage controller to control the first storage unit, and a first memory to store a first control program to process an input/output (I/O) request received by the first platform storage system. A second platform storage system includes a second network to communicate with the host computer, a second storage unit to provide storage volumes, a second storage controller to control the second storage unit, and a second memory to store a second control program to process an I/O request received by the second platform storage system. An external storage system is coupled to the first and second platform storage systems, the external storage system including a third storage unit to provide storage volumes and a third storage controller to control the third storage unit. The first and second platform storage systems are configured to present the storage volumes of the external storage system to the host computer, so that the host computer can access the storage volumes of the external storage system via one of the first and second platform storage systems if the host computer is unable to access the storage volumes of the external storage system via the other platform storage system.

10 Claims, 25 Drawing Sheets

U.S. PATENT DOCUMENTS

| | | |
|---|---|---|
| 7,219,260 B1 * | 5/2007 | de Forest et al. .............. 714/15 |
| 7,334,029 B2 | 2/2008 | Shiga et al. |
| 2002/0133735 A1 * | 9/2002 | McKean et al. ................ 714/5 |
| 2003/0212864 A1 * | 11/2003 | Hicken et al. ............... 711/122 |
| 2003/0212921 A1 * | 11/2003 | Howe ............................ 714/8 |
| 2005/0182769 A1 * | 8/2005 | Fujita et al. ................... 707/10 |
| 2005/0193228 A1 * | 9/2005 | Miki ............................ 714/4 |
| 2005/0273647 A1 * | 12/2005 | Furuumi et al. ................ 714/5 |
| 2006/0020755 A1 * | 1/2006 | Jiang et al. .................. 711/114 |
| 2008/0140905 A1 * | 6/2008 | Okuyama et al. ............. 711/4 |
| 2008/0307160 A1 * | 12/2008 | Humlicek .................. 711/113 |

* cited by examiner

1007

| Vol. ID | State | Port ID | Destination Port | LUN |
|---|---|---|---|---|
| St1-V1 | Active | Port 1 | Port A | 0 |
| | Standby | Port 2 | Port B | 0 |
| | ... | | | |
| St2-V1 | | | | |
| ... | | | | |

| Port | LUN | Vol. ID |
|---|---|---|
| Port A | 0 | St1-V1 |
|  |  |  |
| ... |  |  |

*(column headers labeled 3001, 3002, 3002)*

| Vol. ID | IN./EXT. | External Vol. ID | Initiator Port | Destination Port | LUN |
|---|---|---|---|---|---|
| St1-V1 | EXT | Vol. 1 | Port 3 | Port A | 0 |
| St0-V1 | IN | | | | |
| ... | | | | | |

| Vol.ID | LBA | State | Locked by | Data |
|---|---|---|---|---|
| St1-V1 | 0 | CLEAN | NONE | (content) |
| St1-V1 | 128 | DIRTY | SELF | |
| ... | | | | |

| LAN Port | IP Address | Standby IP Address |
|---|---|---|
| Port A | aaa.bbb.ccc.ddd | eee.fff.ggg.hhh |
|  |  |  |
| ... |  |  |

22001 — LAN Port
22002 — IP Address
22003 — Standby IP Address

| Vol. ID | IN./EXT. | Mount |
|---------|----------|-------|
| St1-V1 | IN | YES |
| St2-V1 | EXT | NO |
| ... | | |

FIGURE 23

CLUSTERED STORAGE SYSTEM WITH EXTERNAL STORAGE SYSTEMS

BACKGROUND OF THE INVENTION

The present invention relates a computer storage system, in particular to a clustered storage system with external storage systems.

Recent computer storage systems have been provided with a function called "external connection" that connects a storage system to other storage systems. Such a function allows a storage system to discover disk volumes in the external storage systems and export them to host computers via its communication ports as if the disk volumes are internal volumes.

If the storage system has advanced functions, for example, volume mirroring, large capacity of cache memory, various host-connectivity and so on, it can provide these functions to external storage systems which do not have such functions. A storage system that has an external connection function may be referred to as a platform storage system. Storage volumes located within the platform storage system (or local storage system) are referred to as internal volumes, and storage volumes located within an external storage system are referred to as external volumes. The details of a storage system with external storage systems are disclosed in U.S. Pat. No. 6,529,976, which is incorporated by reference.

Data in the external storage system are read and written through the platform storage system. If some failure occurs in the platform storage system or at a connection link between a platform storage system and an external storage system, the data in the external storage system cannot be accessed. A conventional highly available storage system which duplicates data in two storage devices, e.g., in two different disk array units, can be used to ensure that the data are accessible even when the platform storage system fails; however, such a system is very expensive.

BRIEF SUMMARY OF THE INVENTION

The present invention is directed to a computer system having a plurality of platform storage systems that are coupled to one or more external storage systems. In one embodiment, a computer storage system comprises two platform storage systems that share an external storage system and disk volumes. Host computers read and write data in the disk volumes of the external storage system through both of these platform storage systems. If a host computer tries and fails to access the data through one platform storage system, the host computer uses the other platform storage system to access the data stored in the external storage system. If the platform storage systems cache data, cache coherency is maintained to guarantee data integrity. If each platform storage systems has a NAS (Network Attached Storage) modules and one of the NAS modules fails, the file systems that are provided by the failed module can be accessed via the other platform storage system's NAS module.

In one implementation, each platform storage system may works both as a platform storage system and the other's external storage system. The platform storage systems communicates with each other using an external connection function, where one platform storage system recognizes the other's internal disk volumes as external volumes.

In one embodiment, a data storage system comprises a first platform storage system including a first network interface to communicate with a host computer, a first storage unit to provide storage volumes, a first storage controller to control the first storage unit, and a first memory to store a first control program to process an input/output (I/O) request received by the first platform storage system. A second platform storage system includes a second network to communicate with the host computer, a second storage unit to provide storage volumes, a second storage controller to control the second storage unit, and a second memory to store a second control program to process an I/O request received by the second platform storage system. An external storage system is coupled to the first and second platform storage systems, the external storage system including a third storage unit to provide storage volumes and a third storage controller to control the third storage unit. The first and second platform storage systems are configured to present the storage volumes of the external storage system to the host computer, so that the host computer can access the storage volumes of the external storage system via one of the first and second platform storage systems if the host computer is unable to access the storage volumes of the external storage system via the other platform storage system.

In another embodiment, a method for processing an input/output (I/O) request in a data storage system is disclosed. The data storage system includes a host computer, first and second platform storage system, and at least one external storage system, wherein the host computer are coupled to the first and second platform storage systems, the first and second platform storage systems being coupled to an external storage system and being configured to present storage volumes of the external storage system to the host computer, so that the host computer can access the storage volumes of the external storage system via one of the first and second platform storage system. A first path to a target volume is selected using a path table managed by the host computer, the target volume being a storage volume in the external storage system. A first I/O request is sent to the first platform storage system according to the selected first path. A second path to the target volume is selected using the path table if the first I/O request is not successfully processed. A second I/O request is sent to the second platform system according to the selected second path, the second I/O request corresponding to the first I/O request.

The method further comprises obtaining information on initiator and destination ports associated with the target volume at the second platform storage system; and sending a third I/O request corresponding to the second I/O request to the external storage system using the initiator port and the destination port, so that the target volume may be accessed.

In yet another embodiment, a computer readable medium includes a computer program for processing a data access request in a data storage system is disclosed. The data access request includes read and write requests. The data storage system includes a host computer, first and second platform storage system, and at least one external storage system. The host computer is coupled to the first and second platform storage systems, the first and second platform storage systems being coupled to an external storage system and being configured to present storage volumes of the external storage system to the host computer, so that the host computer can access the storage volumes of the external storage system via one of the first and second platform storage system.

The computer program comprises code for selecting a first path to a target volume using a path table managed by the host computer, the target volume being a storage volume in the external storage system; code for sending a first I/O request to the first platform storage system according to the selected first path; code for selecting a second path to the target volume using the path table if the first I/O request is not successfully processed; and code for sending the first I/O request to the second platform system according to the selected second path.

BRIEF DESCRIPTION OF THE DRAWINGS

FIGS. 2-4 illustrate an exemplary path table, exemplary LUN table, and exemplary volume table.

FIG. 9 illustrates a cache table including cached data and its state according to one embodiment of the present invention.

FIG. 22 illustrates a more detailed view of an IP address table according to one embodiment of the present invention.

FIG. 23 illustrates the structure of a file system table according to one embodiment of the present invention

DETAILED DESCRIPTION OF THE INVENTION

Figure 1:
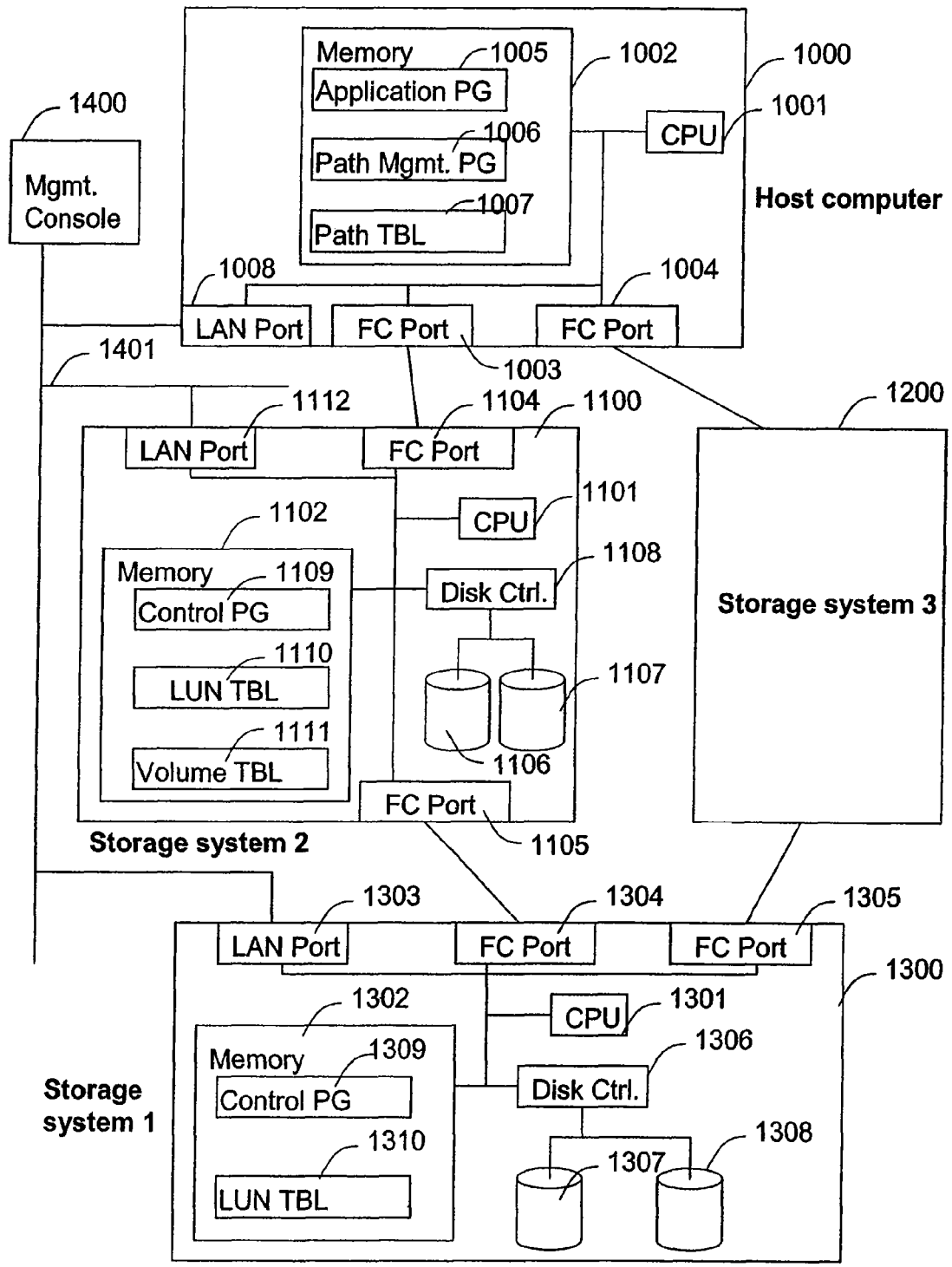
FIG. 1 illustrates a clustered storage system including a plurality of platform storage systems according to one embodiment of the present invention.

FIG. 1 illustrates a clustered storage system including a plurality of platform storage systems 1100 and 1200 according to one embodiment of the present invention. The platform storage systems may or may not have cache memories. In the present embodiment, the platform storage systems do not have cache memories. The two platform storage systems share an external storage system 1300, so that an external volume has two paths to a host computer 1000. If one platform storage system fails, host computer can access data in the external volumes through another platform storage system. The clustered storage system may have more than two platform storage systems in other implementations. Similarly, there may be two or more external storage systems.

Platform storage system 1100 includes a CPU 1101 that executes a control program 1109 in memory 1102. Disk controller 1108 controls I/Os received from or I/Os to be sent to disk drives 1106 and 1107. For simplicity, one disk drive is assumed to be exported to the host computer as one disk volume in the description herein. Fibre Channel (FC) port 1104 communicates with an FC port in the host computer. FC port 1105 communicates with FC port 1304 in the external storage system.

Memory 1102 includes a control program 1109 which controls the storage system and processes I/O requests from host computer 1000. The memory also includes Logical Unit Number (LUN) table 1110 which contains mapping information of LUN and disk volume for each FC port. FIG. 3 illustrates an exemplary LUN table, which includes a column 3001 for unique identifier of FC port, for example, WWN (World Wide Name), a column 3002 for LUN assigned to a disk volume whose ID is recorded in a column 3003. The volume ID is assigned by a control program in a storage system which has the volume. The volume ID is unique in the entire system. Host computer or platform storage system can send INQUIRY command to a volume in other storage system and obtain its ID as a response to the command.

Memory 1102 also includes a volume table 1111 that contains information of external volumes. FIG. 4 illustrates an exemplary volume table. A column 4001 indicates volume ID assigned by storage system 1100. A column 4002 indicates an internal flag (or "IN") or external flag (or "EXT"). The internal flag is used to identify the volume as being an internal volume, and the external flag is used to identify the volume as being an external volume.

Columns 4003-4006 are used if the volume is an external volume. Column 4003 indicates the external volume ID. Column 4004 indicates the initiator port ID. The initiator port is the port that is used to access the volume and is located at the platform storage system. Column 4005 indicates the destination port ID that is located at the external storage system. Column 4006 indicates the LUN assigned to the volume by the external storage system.

The configuration of platform storage system 1200 is similar to that of platform storage system 1100 in the present embodiment, but may be different other embodiments. External storage system 1300 includes a LAN port 1303, FC ports 1304 and 1305, a memory 1302, a CPU 1301, a disk controller 1306, and disk drives 1307 and 1308. Memory 1302 includes a control program 1309 and LUN table 1310. The configuration of external storage system 1300 is similar to that of platform storage system 1100. One difference is that memory 1302 does not have a table such as volume table 1111 and external storage system 1300 has no initiator port.

Host computer 1000 includes a CPU 1001 and memory 1002. The memory includes an application program 1005 which generates I/O requests to the data stored in the external volumes, and a path management program 1006 which sends the I/O requests to the storage systems. If the initial attempt fails, path management program 1006 resends the I/O request through another path. An appropriate path to the external volume is selected using a path table 1007 in memory 1002.

FIG. 2 illustrates an exemplary path table. A column 2001 indicates volume ID. A column 2002 indicates the state of a path, e.g., "Active," "Standby," and "Invalid." "Active" indicates that the path is the currently active path and ready for use. "Standby" indicates that the path is not currently active but may be used if all active paths fail. "Invalid" indicates that the path is not ready for use. A column 2003 indicates the identifier for the initiator port. A column 2004 indicates the identifier for the target port. A column 2005 indicates the target LUN.

Referring back to FIG. 1, a management console 1400 is a computer that has management program and user interface to manage the storage systems and host computer. Console 1400 sends and receives management information through a LAN 1401. An administrator or user configures LUN tables, volume tables, and so on from this management console.

Figure 5:
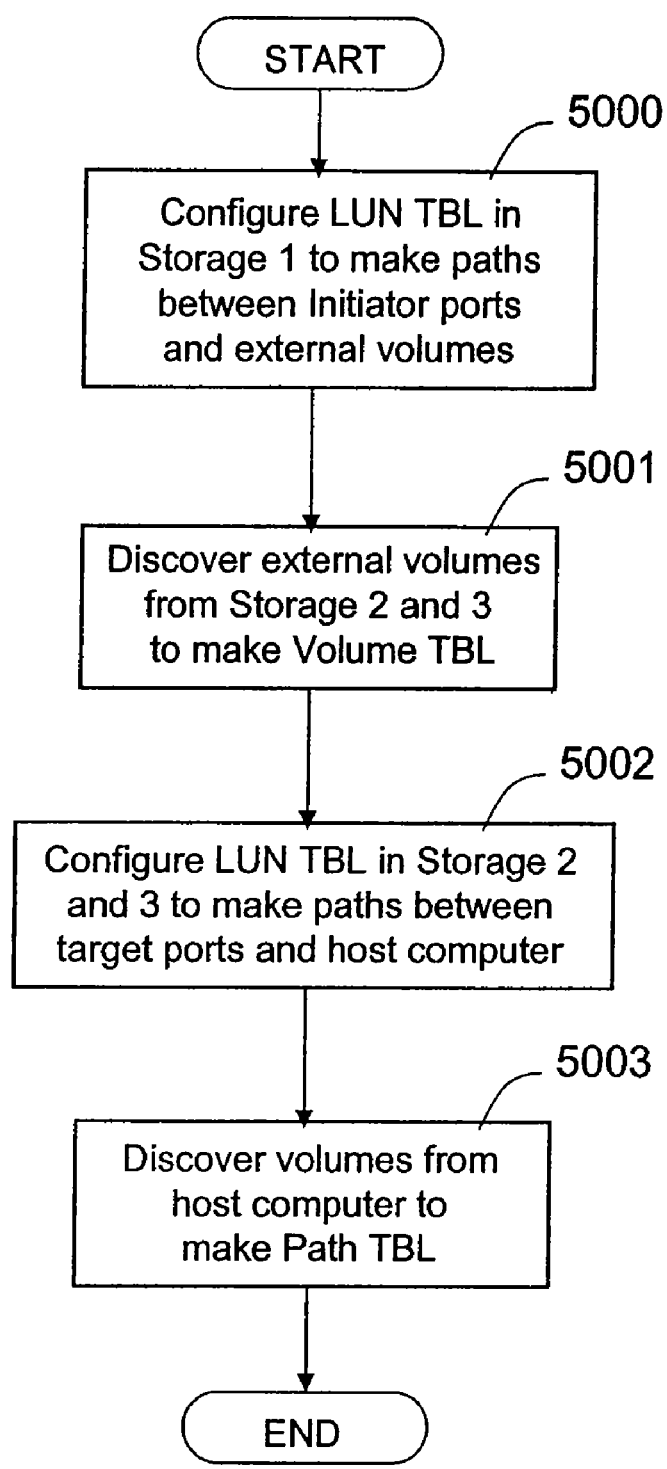
FIG. 5 shows a process for system initialization according to one embodiment of the present invention.

FIG. 5 shows a process for system initialization according to one embodiment of the present invention. At step 5000, an administrator configures a LUN table in the external storage system to enable exporting of its volumes to the platform storage systems. A volume is provided with two paths: one for platform storage system 1100 and the other for platform storage system 1200.

Next, the administrator instructs the platform storage systems to discover the external volumes (step 5001). The control program 1109 scans the volumes using FC port 1105 to obtain the identifier of the corresponding FC port 1304 in the external storage system, the IDs of the volumes assigned to FC port 1304, and LUNs corresponding to the volumes. This information is stored volume table 1111. Also, control program 1109 assigns volume IDs (for column 4001) to the discovered external volumes.

At step 5002, the administrator configures LUN table 1110 in the platform storage systems to export the discovered volumes to the host computer. Finally, the administrator instructs the host computer to discover the exported disk volumes (step 5003). Path management program 1006 scans volumes, obtains the information about the discovered volumes, and stores them into path table 1007. Generally, path management program 1006 can detect alternative paths to a given volume by accessing path table 1007 using the volume ID (or column 2001). If the volume ID contains the ID assigned by the external storage system and the path management program recognizes it, it is also possible to detect the alternative paths to the same external volume and generate path table 1007 automatically. If not, the administrator configures the table so that paths to the same external volume are grouped as alternative paths. One or more paths may be indicated as being "Active" for each volume.

Figure 6:
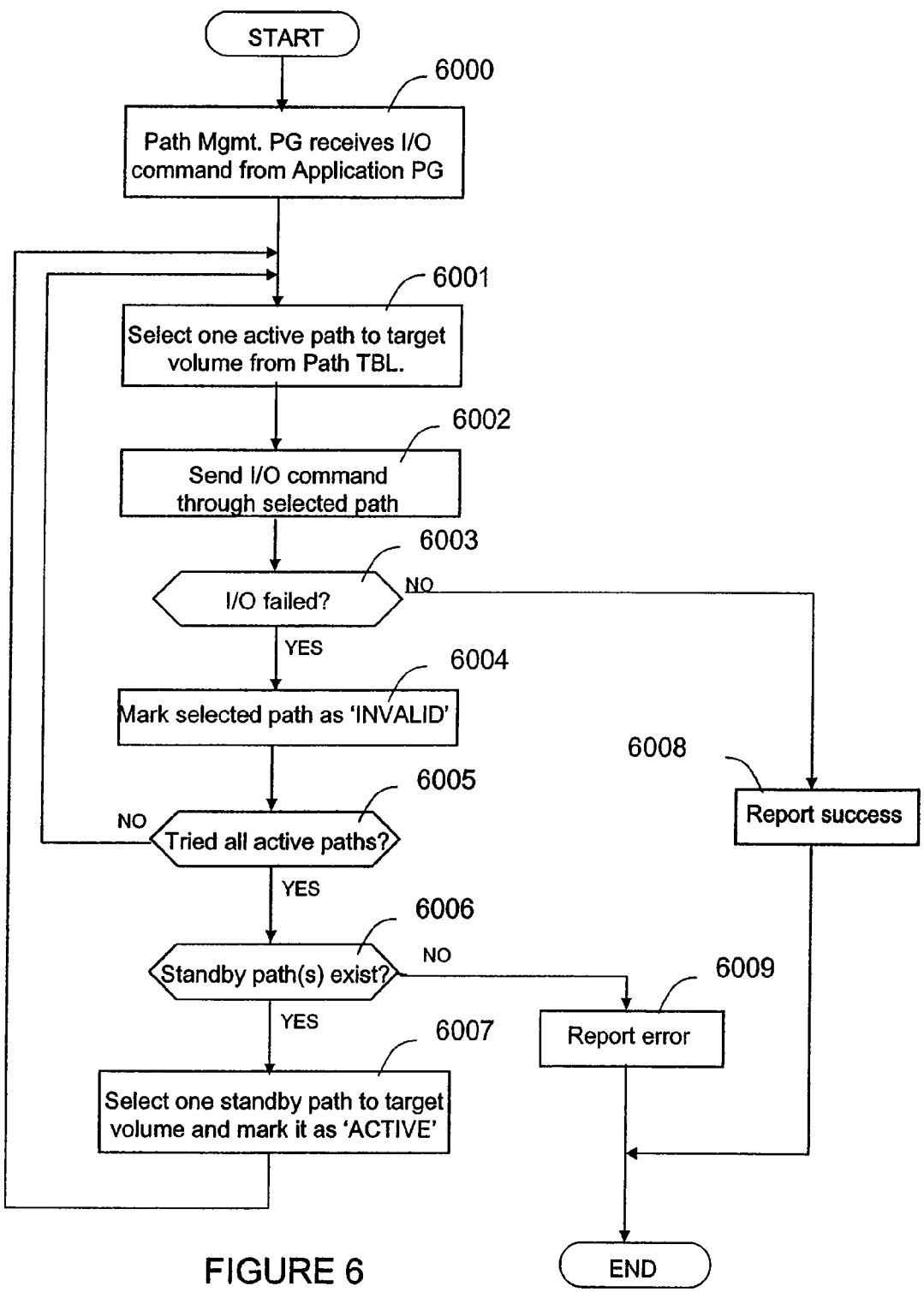
FIG. 6 shows a process performed by a path management program in host computer according to one embodiment of the present invention.

FIG. 6 shows a process performed by path management program 1007 in host computer according to one embodiment of the present invention. Path management program 1007 receives an I/O request from an application program (step 6000). Path management program 1007 selects an active path for sending the request to the target volume (step 6001) and sends the I/O request through the selected path (step 6002). If the operation is successful, the path management program notifies the application program of this (step 6008). If the operation did not succeed, path management program 1007 changes the state of the path selected at step 6001 to "Invalid" in the path table 1007 (step 6004). Another active path, if any, is selected and the I/O request is transmitted again (step 6005), and so on. If all available active paths fail, a standby path is selected and used (step 6007). If all paths including the standby path fail, path management program 1006 reports error to the application program (step 6009).

Figure 7:
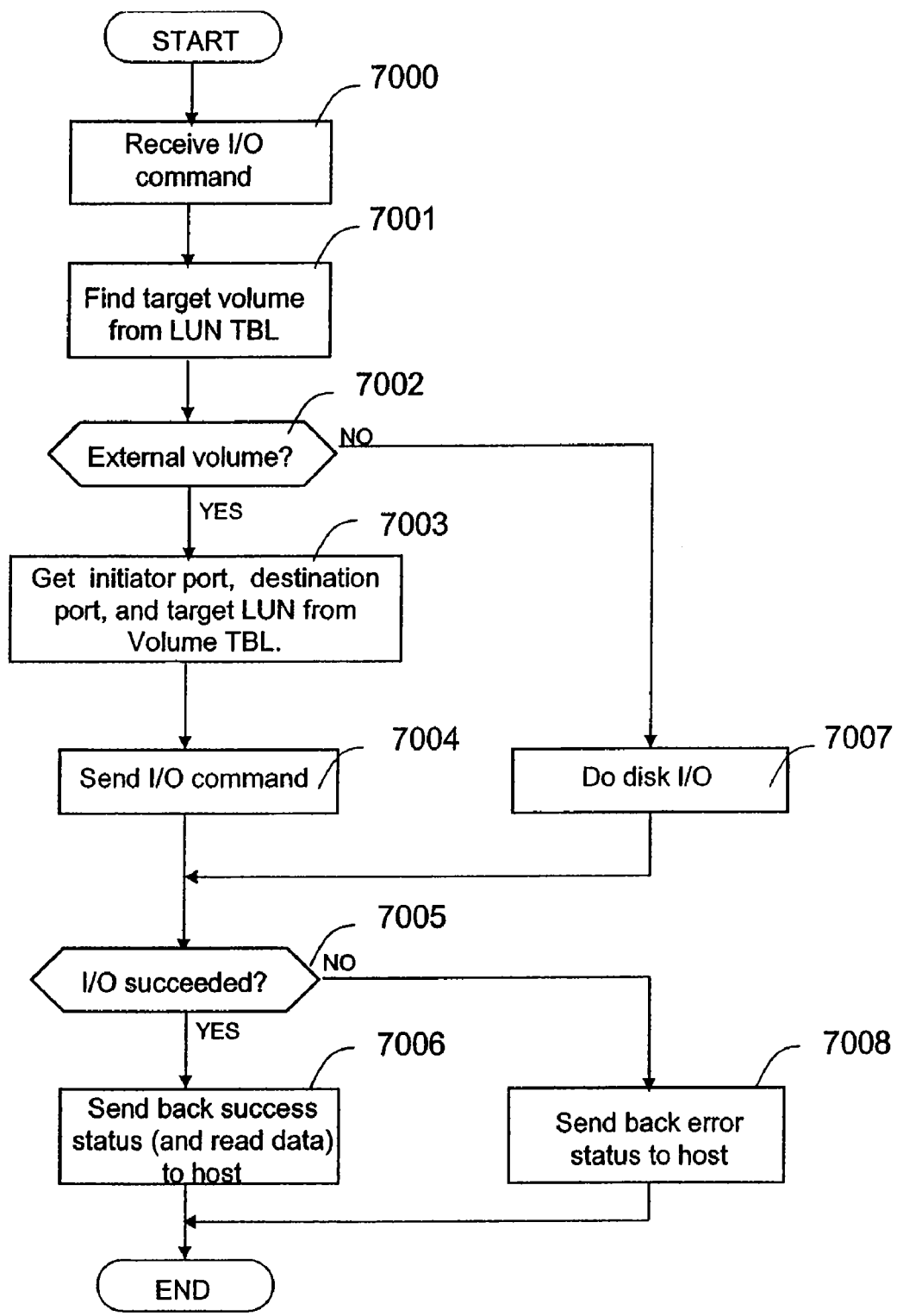
FIG. 7 shows a process performed by a control program in a platform storage system according to one embodiment of the present invention.

FIG. 7 shows a process performed by control program 1109 in platform storage system 1100 according to one embodiment of the present invention. Control program 1109 receives an I/O request or command from host computer 1000 (step 7000). The control program determines whether or not the target volume is an internal volume or external volume by accessing LUN table 1110 and volume table 1111 (steps 7001 and 7002). If it is an internal volume, the control program reads or writes data to and from the disk drives located in the platform storage system (step 7007) and returns the status of the operation to host computer 1000 (steps 7005-7008).

If the target volume is an external volume, the control program sends the I/O command to the external storage system (steps 7003 and 7004). At step 7003, the initiator and destination port information are obtained from the volume table. LUN for the target volume is also obtained. The above illustrates a method and system for achieving high availability of external volumes without data duplication. The data stored in the external volumes are available to the host computer even when one of the platform storage systems fails.

Figure 8:
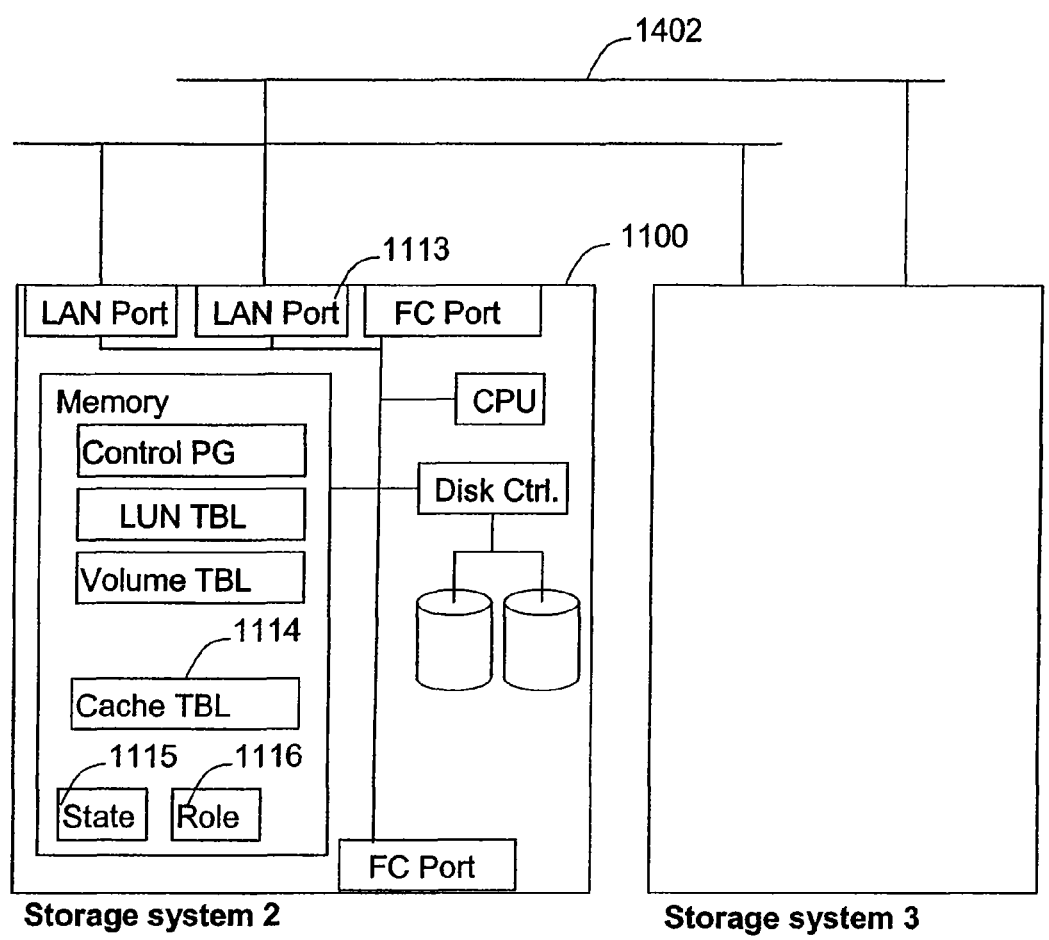
FIG. 8 illustrates a clustered storage system having a plurality of platform storage systems with cache memories according to one embodiment of the present invention.

FIG. 8 illustrates a clustered storage system having a plurality of platform storage systems with cache memories according to one embodiment of the present invention. Like components are indicated with the same numerals wherever possible for ease of illustration. In FIG. 8, platform storage system 1100 has another LAN port 1113 as well as LAN port 1112. Each LAN port is connected to a different network 1401, 1402 to provide redundancy in case one of the network fails. Both LANs are used to detect network failure. For example, one platform storage system uses LAN 1401 to send instructions to the other platform storage system and receive status, and the other uses LAN 1402. Memory 1102 includes a cache table 1114, state variable 1115, and role variable 1116. Platform storage system 1200 has similar configuration as that of platform storage system 1100.

FIG. 9 illustrates cache table 1114 including cached data and its state according to one embodiment of the present invention. Columns 9001 and 9002 contain information about the location of the cached data, i.e., volume ID and Logical Block Address (LBA). Column 9003 contains the state of the cached data, e.g., CLEAN, DIRTY, and INVALID. CLEAN means that the cached data and data stored in disk volume are the same. DIRTY means the cached data is different from the data stored in the disk volumes. INVALID means the cached data is invalid.

A column 9004 contains the state of lock which is used to maintain cache coherency, e.g., NONE, SELF, and OTHER. NONE means that the cached data is not locked. SELF means the cached data is locked by the platform storage system which has the cache table in question (i.e., by the local storage system). OTHER means the cached data is locked by the platform storage system that does not have the cache table in question (i.e., by a remote storage system). For example, if the platform storage system 1200 locks the cache data stored in cache table 1114 of platform storage system 1100, it would indicate OTHER. A column 9005 contains the actual cached data. For illustrative convenience, it is assumed that each I/O request sent by the host computer relates to one sector specified by LBA and each cache block in cache table 1114 includes data for one sector.

State variable 1115 indicates the state of platform storage systems 1100 and 1200, e.g., DUAL, SINGLE, and FAILED. DUAL means that both of the platform storage systems 1100 and 1200 are in operation. SINGLE means the local platform storage system is operational but the remote platform storage system has failed. FAILED means the local platform storage system has failed.

Role variable 1116 is set by the administrator in the initialization process in the present implementation. One of the platform storage systems is set as PRIMARY, and the other is set as SECONDARY. When both platform storage systems are operational but the one LAN connecting the two storage systems fails, the primary storage system continues to work and the secondary storage system stops to work in order to guarantee data integrity.

Figure 10:
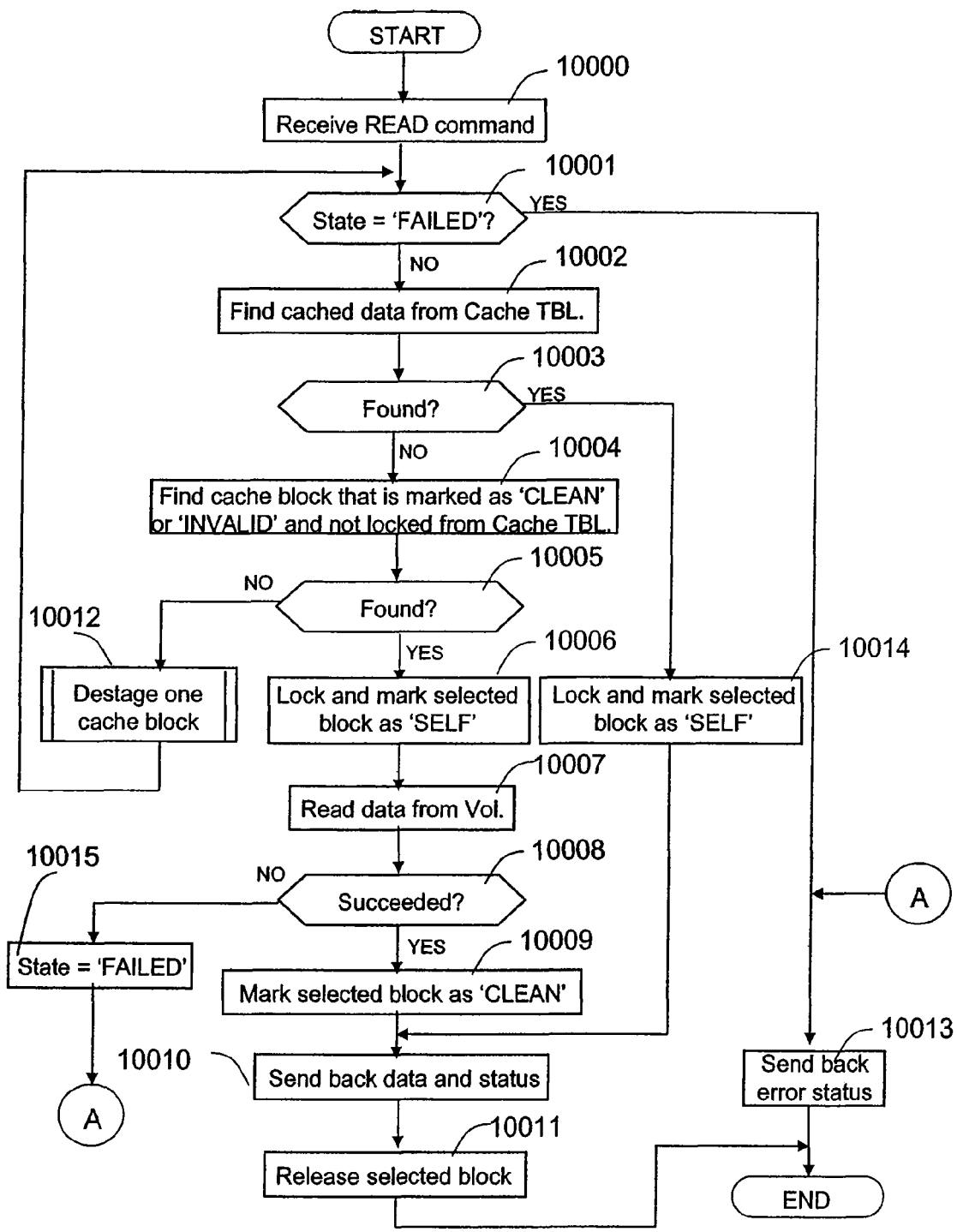
FIG. 10 illustrates a process for reading data from an external storage system according to one embodiment of the present invention.

FIG. 10 illustrates a process for reading data from an external storage system according to one embodiment of the present invention. In the present implementation, this read process is substantially the same for both the primary and secondary platform storage systems. The control program receives a READ command (step 10000). If the state of the platform storage system (e.g., the primary platform storage system) that has received the command is FAILED, it sends back error status to the host computer (step 10013). Otherwise, it searches the cache table (step 10002). If the cached data is found (step 10003), it locks the data (step 10014). The data is indicated as being SELF locked on column 9004 in cache table 1114. If the data was previously locked, it waits until the data is released, then locks it. After locking the cached data, it sends back the data and status (step 10010). The cache data is then released (step 10011).

Referring back to step 10003, if the cached data is not found, the control program attempts to retrieve a line of data from a disk volume. First, it tries to use a line marked CLEAN or INVALID in the cache, so that the data to be retrieved may be stored therein (step 10004). The data line marked CLEAN indicates that the data is already stored into a disk volume and may be erased from the cache memory/table. If no line/block with CLEAN or INVALID is found, one of the block marked DIRTY is destaged (step 10012). The process returns to step 10001. The process for destaging is explained later.

If a line/block marked CLEAN or INVALID is found, the control program locks the data (step 10006). The control program reads data from a disk volume and stores the data into the locked cache block (step 10007). If the read from the volume is successful, the block is marked CLEAN (step 10009), and the data and status are sent back (step 10010). Otherwise, the control program changes the state to FAILED (step 10015) and goes to step 10013.

Figure 11:
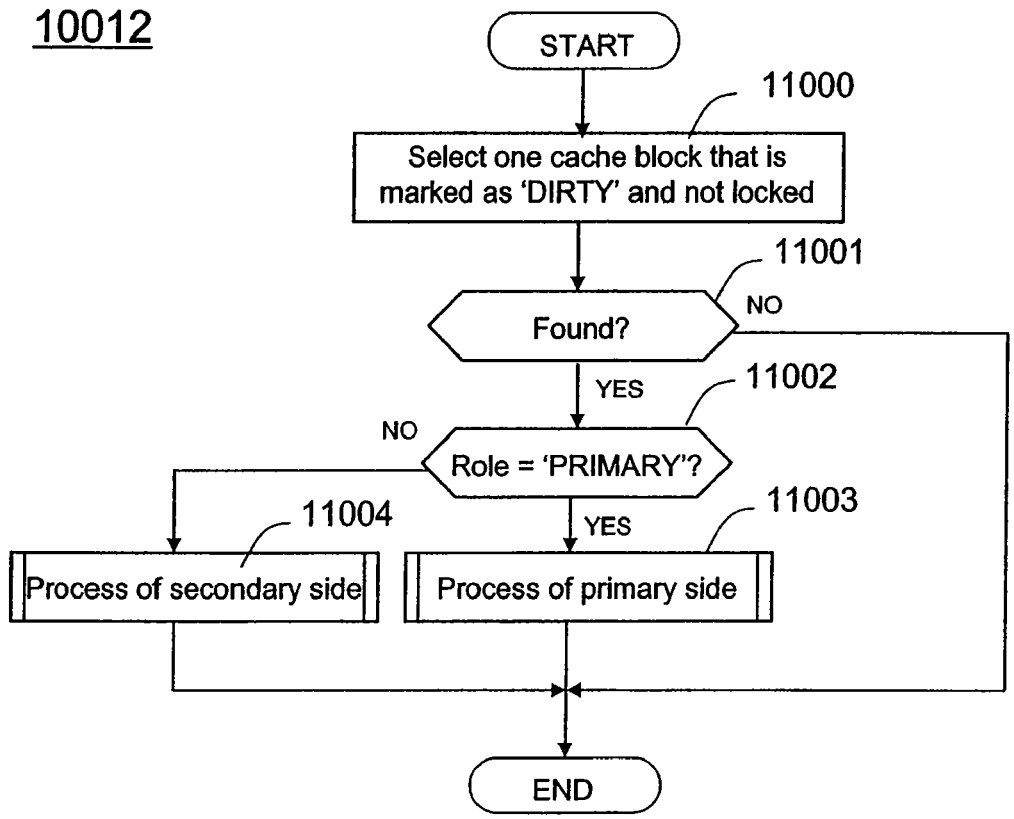
FIG. 11 illustrates a process for destaging according to one embodiment of the preset invention.

FIG. 11 illustrates a process for destaging according to one embodiment of the preset invention. First, the control program selects a cache block marked as DIRTY (step 11000). If such a block is not found, the process terminates (step 11001). If such a block is found, the role of the platform storage system is referred (step 11002). If the platform storage system is a primary storage system, a given process is performed (step 11003). If it is a secondary storage system, another process is performed (step 11004). The destaging process is different for the primary and secondary platform storage systems. In order to keep cache coherency, a DIRTY cache block in the two platform storage systems should be locked for operations. Generally, in order to avoid deadlock, the cache block in the primary side is locked first, and then the cache block in the secondary side is locked thereafter. The order of releasing the block is the reverse.

Figure 12:
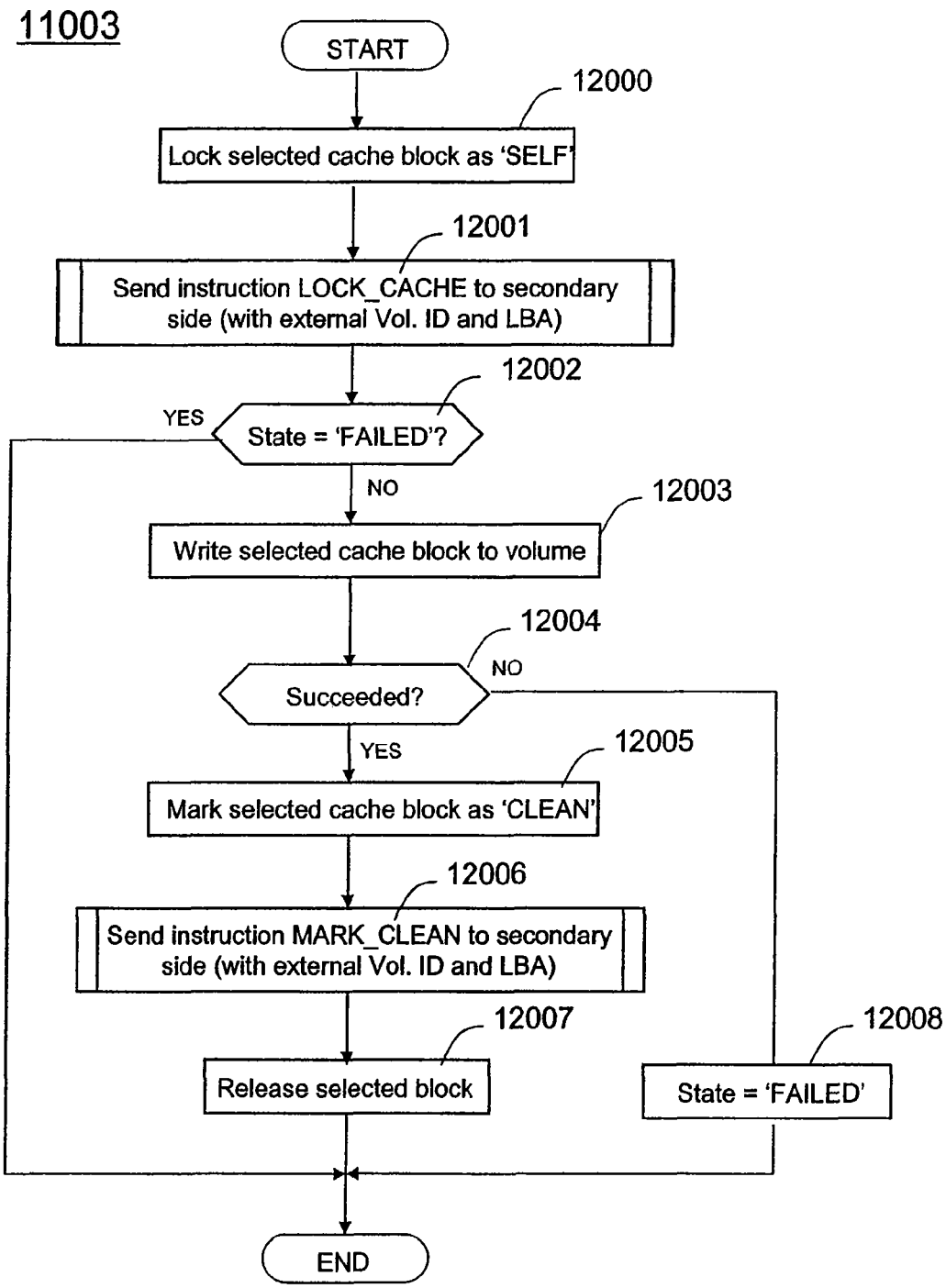
FIG. 12 illustrates a destaging process as performed in a primary platform storage system according to one embodiment of the present invention.

FIG. 12 illustrates a destaging process as performed in a primary platform storage system according to one embodiment of the present invention. First, the control program locks the selected DIRTY data block (step 12000). If the data block is already locked, it waits until the data is released. The control program instructs the secondary platform storage system to lock the same data by sending LOCK_CACHE instruction, external volume ID, and LBA via a LAN (step 12001). Next, it confirms that the state is not FAILED since if the state is FAILED, the cache data marked as DIRTY can be older than the data in disk volumes or cache table in the other platform storage system. If the state is not FAILED, the control program writes the data into a disk volume (step 12003). If the operation fails, it changes the state to FAILED and the process is terminated (step 12008). Otherwise, the control program changes the cache state to CLEAN (step 12005), instructs the secondary platform storage system to mark the data block as being CLEAN (step 12006), and releases the block (step 12007). The locked state is changed to NONE when the block is released.

Figure 13:
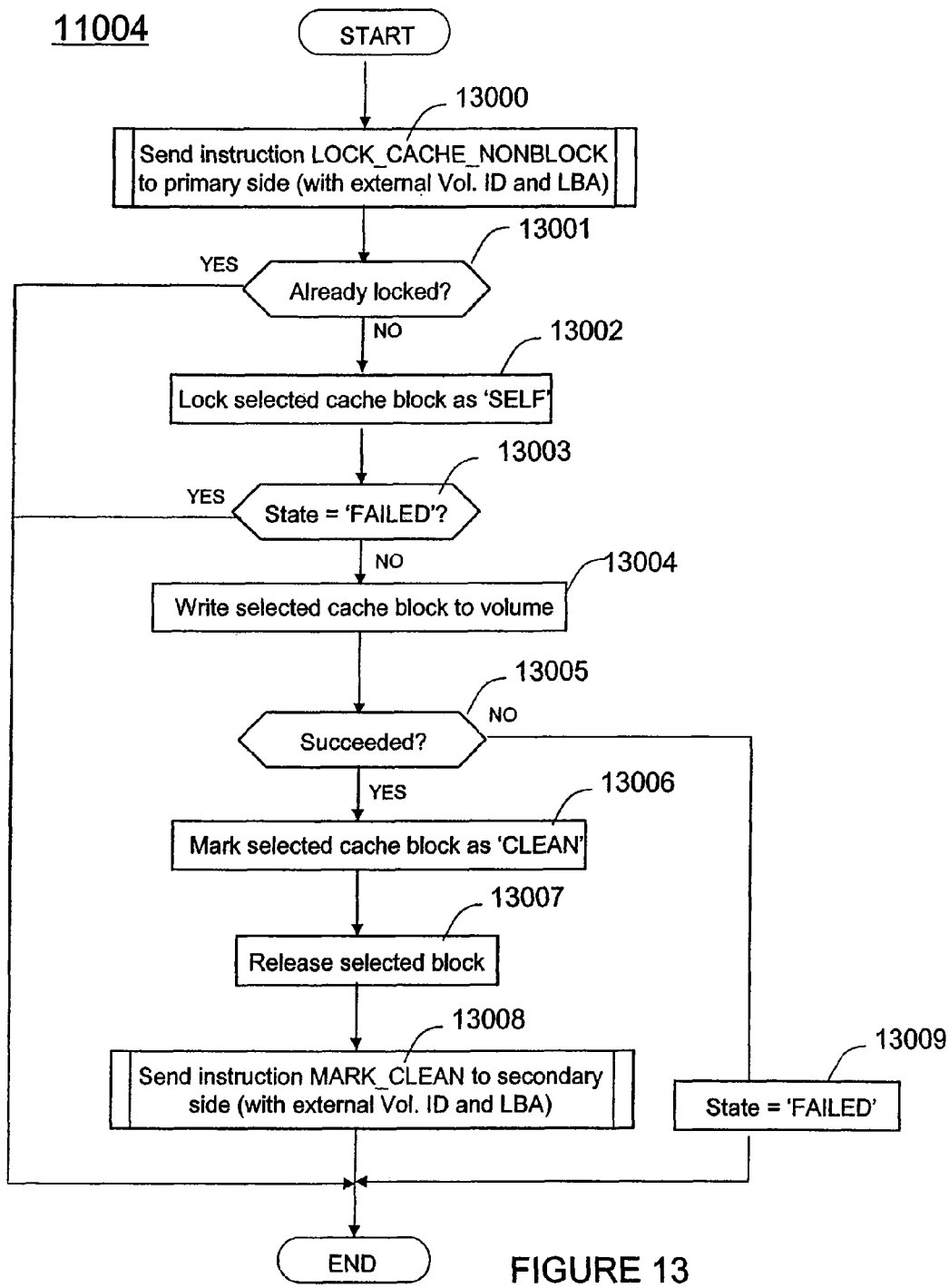
FIG. 13 illustrates a process for destaging in a secondary platform storage system according to one embodiment of the present invention.

FIG. 13 illustrates a process for destaging in a secondary platform storage system according to one embodiment of the present invention. The process flow is similar to that of the primary side. One difference is that the order of locking the cache block. At step 13000, the control program sends LOCK_CACHE_NONBLOCK instead of LOCK_CACHE. This difference results since if the specified cache data is already locked, the former does not wait and reports that the data is locked. By using this instruction, if both control programs in the primary and secondary side start to destage the same data, only the primary side continues the process.

At step 13001, the control program checks to determine if the data block is locked. If yes, the process is terminated. If not, the cache block is locked as SELF (step 13002). The state is checked to determine whether or not it is FAILED (step 13003). If so, the process is terminated. If not, the control program writes the data into a disk volume (step 13004). If the operation is successful, the cache block is marked CLEAN (step 13006). If not, the control program changes the state to FAILED (step 13009).

At step 13007, the cache block is released. The control program instructs the primary platform storage system to mark the data block as being CLEAN (step 13008)

Figure 14:
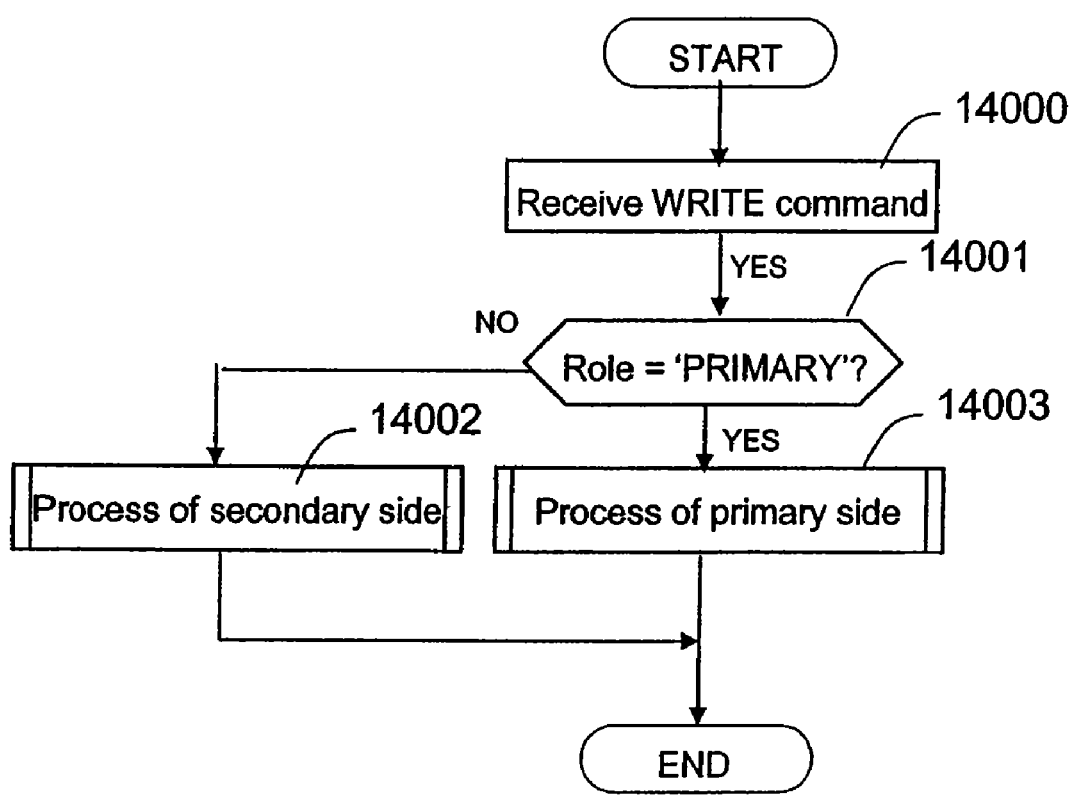
FIG. 14 illustrates a write process performed according to one embodiment of the present invention.

FIG. 14 illustrates a write process performed according to one embodiment of the present invention. At step 14000, a write command is received. The role of the local platform storage system is determined (step 14001). If the local platform storage system is a primary system, a given process is performed (step 14003). If the local platform is a secondary system, another process is performed (step 14002).

Figure 15:
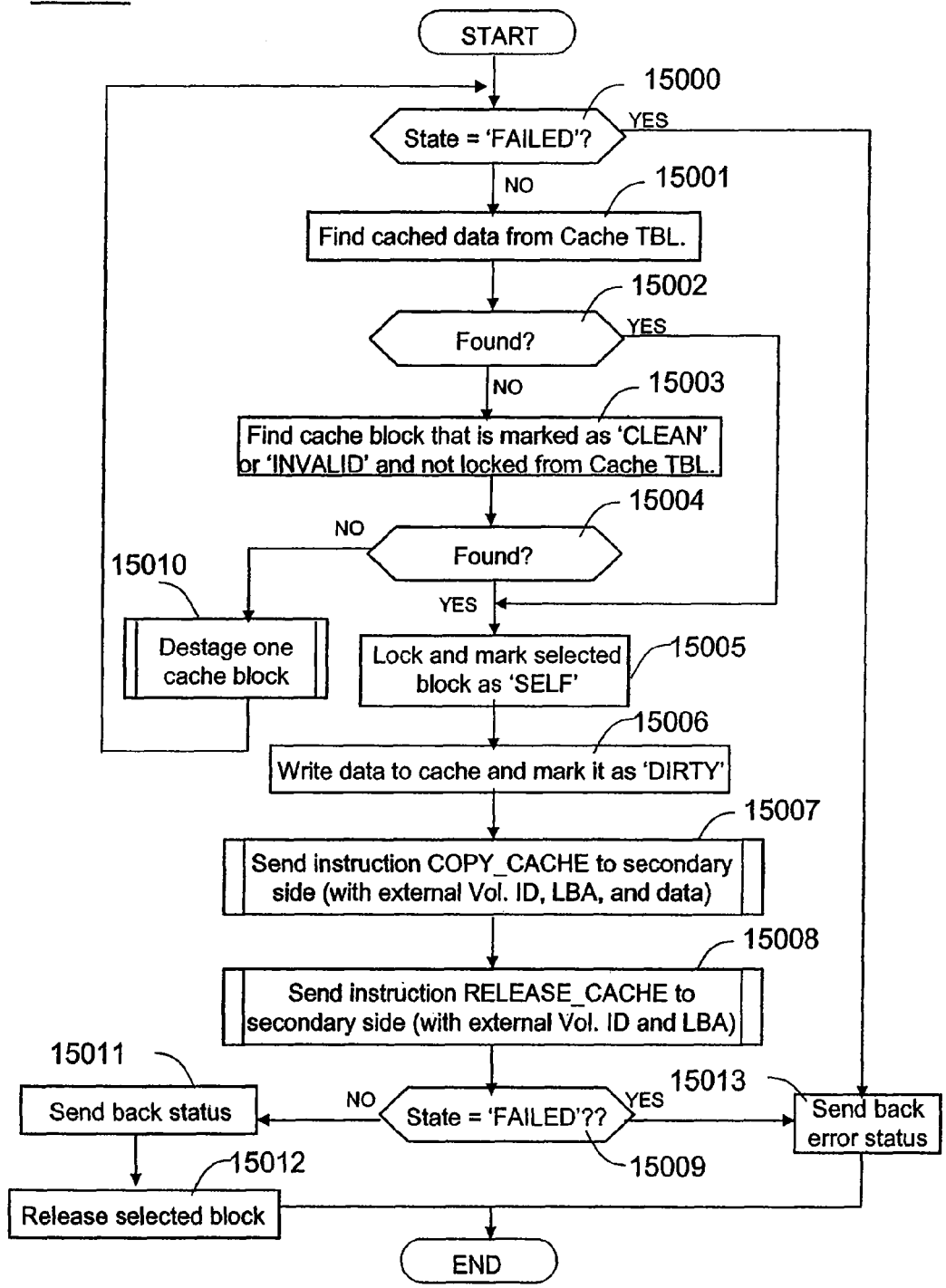
FIG. 15 illustrates a write process performed in a primary platform storage system according to one embodiment of the present invention.

FIG. 15 illustrates a write process performed in a primary platform storage system according to one embodiment of the present invention. The control program determines whether or not the state is FAILED (step 15000). The cache table is searched for the write data (step 15001). If the write data is found (step 15002), the process goes to step 15005. If the write data is not found, the cache table is searched for a cache block that is marked as CLEAN or INVALID and is not locked (step 15003). If such a block is found, the process proceeds to step 15005. If not, a cache block is destaged (step 15010), and the process returns to step 15000.

At step 15005, after acquiring a cache block for storing data, the control program locks the block (step 15005), stores the data into the cache block and mark it as DIRTY (step 15006), and instructs the secondary side to copy the cached data by sending instruction COPY_CACHE, external volume ID, LBA, and data (step 15007). The secondary side is instructed to release the copied data (step 15008). Finally, if the state is not FAILED, the control program sends back the completion of the write operation to the host computer (step 15011) and releases the cache block (step 15012). If the state is FAILED, an error status is sent back to the host computer (step 15013), so that the write command may be sent to the other platform storage system.

Figure 16:
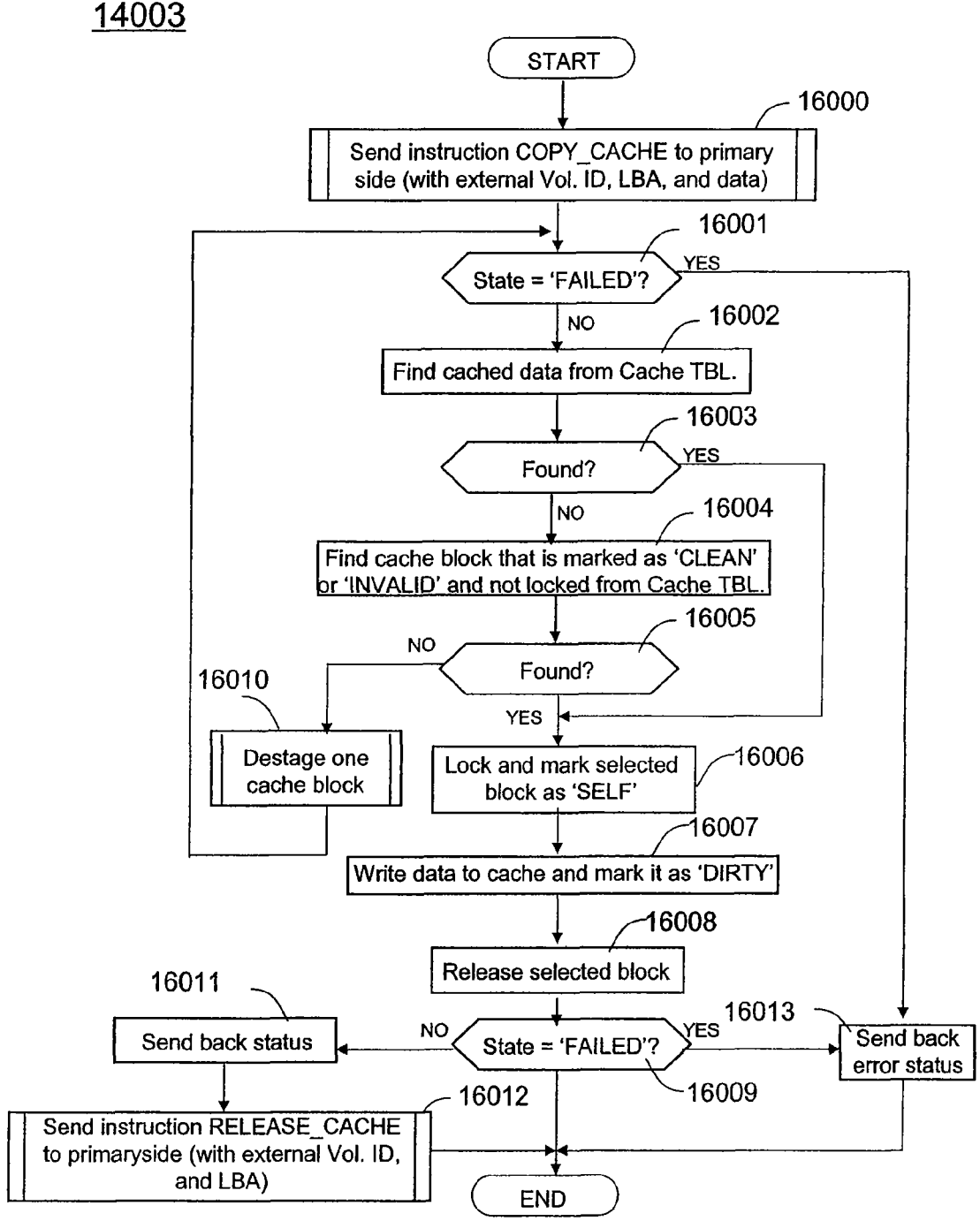
FIG. 16 illustrates a write process performed in a secondary platform storage system according to one embodiment of the present invention.

FIG. 16 illustrates a write process performed in a secondary platform storage system according to one embodiment of the present invention. This process is similar to that of the primary side. The differences are that the order of locking and updating the cache. At step 16000, the control program sends COPY_CACHE instruction to the primary side. The control program determines whether or not the state is FAILED (step 16001). The cache table is searched for the write data (step 16002). If the write data is found (step 16003), the process goes to step 16006. If the write data is not found, the cache table is searched for a cache block that is marked as CLEAN or INVALID and is not locked (step 16004). If such a block is found, the process proceeds to step 16006. If not, a cache block is destaged (step 16010), and the process returns to step 16000.

At step 16006, after acquiring a cache block for data storage, the control program locks the block (step 16006), and stores the data into the cache block and mark it as DIRTY (step 16007). The selected block is released (step 16008). Finally, if the state is not FAILED, the control program sends back the completion of the write operation to the host computer (step 16011). An instruction (RELEASE_CACHE) is sent to the primary side to release the data (step 16012). If the state is FAILED, an error status is sent back to the host computer (step 16013), so that the write command may be sent to yet another platform storage system, if any.

Figure 17:
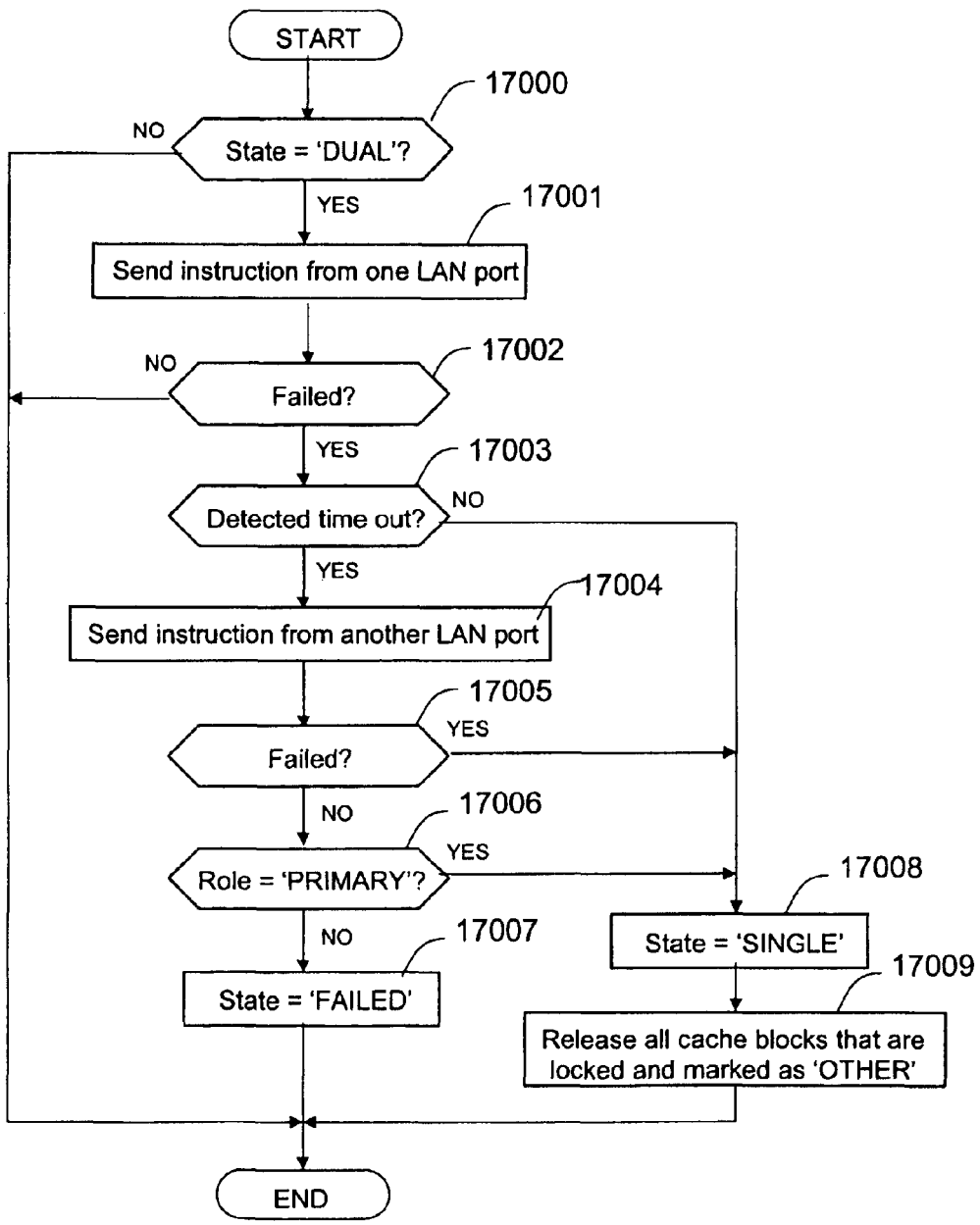
FIG. 17 illustrates a process for sending an instruction according to one embodiment of the present invention.

FIG. 17 illustrates a process for sending an instruction according to one embodiment of the present invention. Before sending instructions to the other side, the control program first confirms that the state is DUAL because it is not necessary to communicate with the other side in other states (step 17000). The instruction is sent via a LAN port (step 17001). If the sending operation is successful (step 17002), the process is terminated.

If the sending operation has failed (step 17002), the process continues. At step 17003, it is determined whether or not the "time out" has occurred (step 17003). If the time out is not detected, that is, the control program receives the status of failure from remote platform storage system, the state is changed to SINGLE (step 17008) and all cache blocks locked by the other side are released (step 17009). The SINGLE state indicates that the other platform storage system (or remote platform system) is experiencing failure. Accordingly, the blocks are released by the local platform storage system since they presumably cannot be released by the other platform storage system that is experiencing the failure. If "time out" is detected, the control program sends the same instruction again through another LAN port (step 17004) because it cannot determine the cause of the failure, e.g., LAN or the other platform storage system. If the retry fails, the control program concludes that the other platform storage system has failed and goes to step 17008. Otherwise, it is determined that the LAN failure has occurred (step 17005). If it is the LAN failure, the role of the local platform storage system is checked (step 17007). If the local platform system is a primary system, the process goes to step 17008 and continues operation. If the local platform system is a secondary system, the state is marked FAILED and stops the operation (step 17007). This is so since if both storage systems continue to work, they may not keep data integrity.

Figure 18:
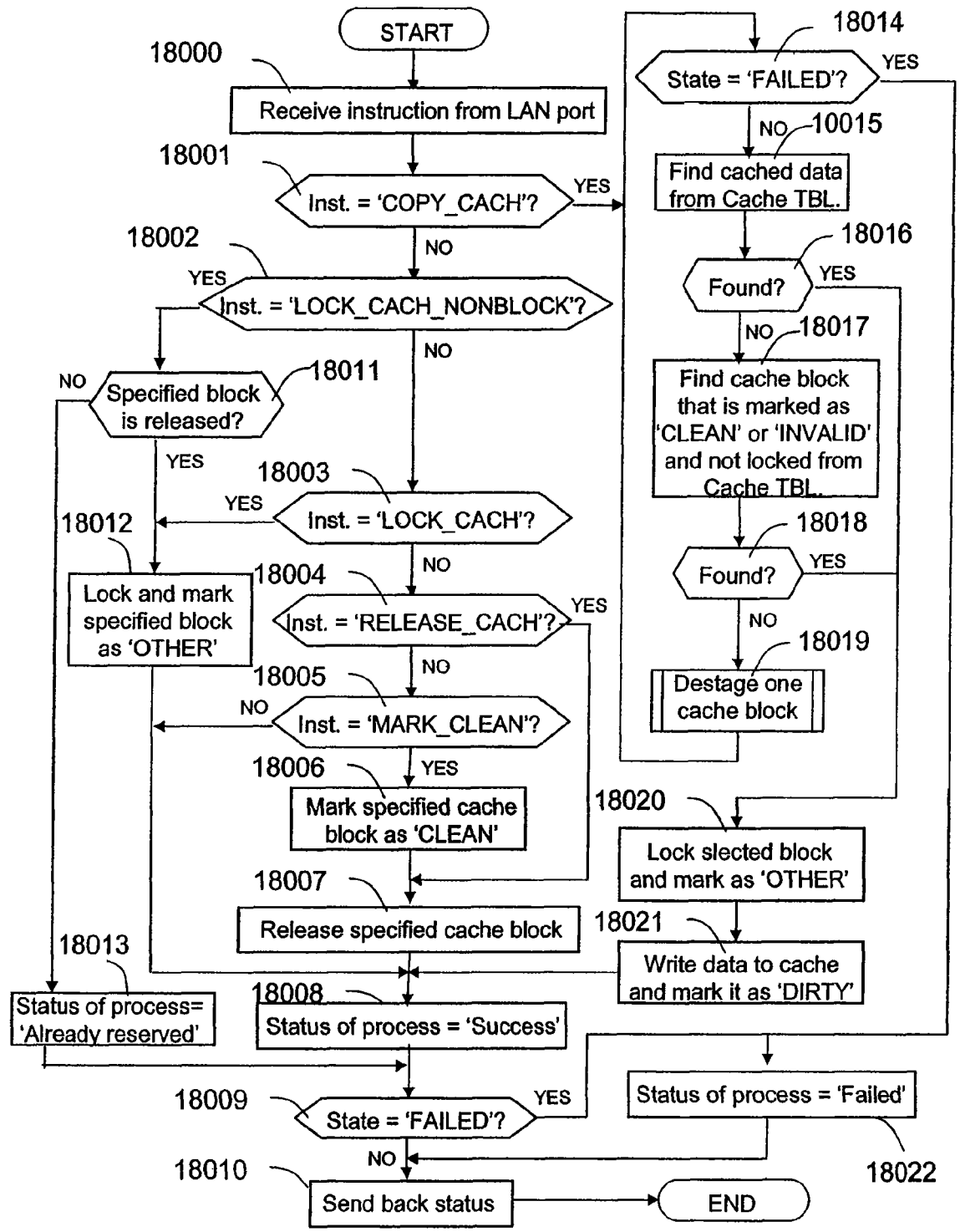
FIG. 18 illustrates a process for receiving an instruction according to one embodiment of the present invention.

FIG. 18 illustrates a process for receiving an instruction according to one embodiment of the present invention. FIG. 18 shows the process flow of COPY_CACHE, LOCK_CACHE_NONBLOCK, LOCK_CACHE, RELEASE_CACHE, and MARK_CLEAN instructions. If a cache block is locked in this process flow, it is marked OTHER because it is locked based on the request from the remote platform storage system.

At step 18000, the control program receives an instruction via a LAN port. If the instruction is COPY_CACHE (step 18001), the process goes to step 18014. The state is checked (step 18014). If the state is FAILED, the process goes to step 18022 to return a "failure" message to the remote platform storage system. If not, the control program searches for the cache data (step 18015) by referring to the cache table and the volume table. If a line which is specified by external volume ID and LBA received with the instruction is found (step 18016), the control program locks the block and marks it as OTHER (step 18020) and writes received data to the cache block (step 18021). If the cache data is not found, one of the cache blocks is destaged (step 18017-18019).

At step 18001, if the instruction is not COPY_CACHE, the control program checks whether the instruction is LOCK_CACHE_NONBLOCK (step 18002). If so, it is determined whether or not the specified block has already been released (step 18011). If the block has already been released, the control program locks the block and marks it as OTHER (step 18012). If the block has not been released, the control program sends back "already locked/reserved" to the other platform system (step 18013).

At step 18002, if the instruction is not LOCK_CACHE_NONBLOCK, the instruction is checked to see if it is LOCK_CACHE (step 18003). If so, the control program locks the specified block (step 18012). If the block has been previously locked, it waits until it is released.

At step 18004, the instruction is checked to see if it is RELEASE_CACHE. If so, specified block is released (step 18007). If the instruction is MARK_CLEAN (step 18005), the specified block is marked CLEAN (step 18006). If the instruction is not MARK_CLEAN, the process proceeds to step 18008.

At step 18008, the operation is indicated as being a success. Before sending this message, the state is checked to see if it is FAILED (the 18009). If yes, a "failure" message" is sent back. If not, a "success" message is sent back (step 18010).

Figure 19:
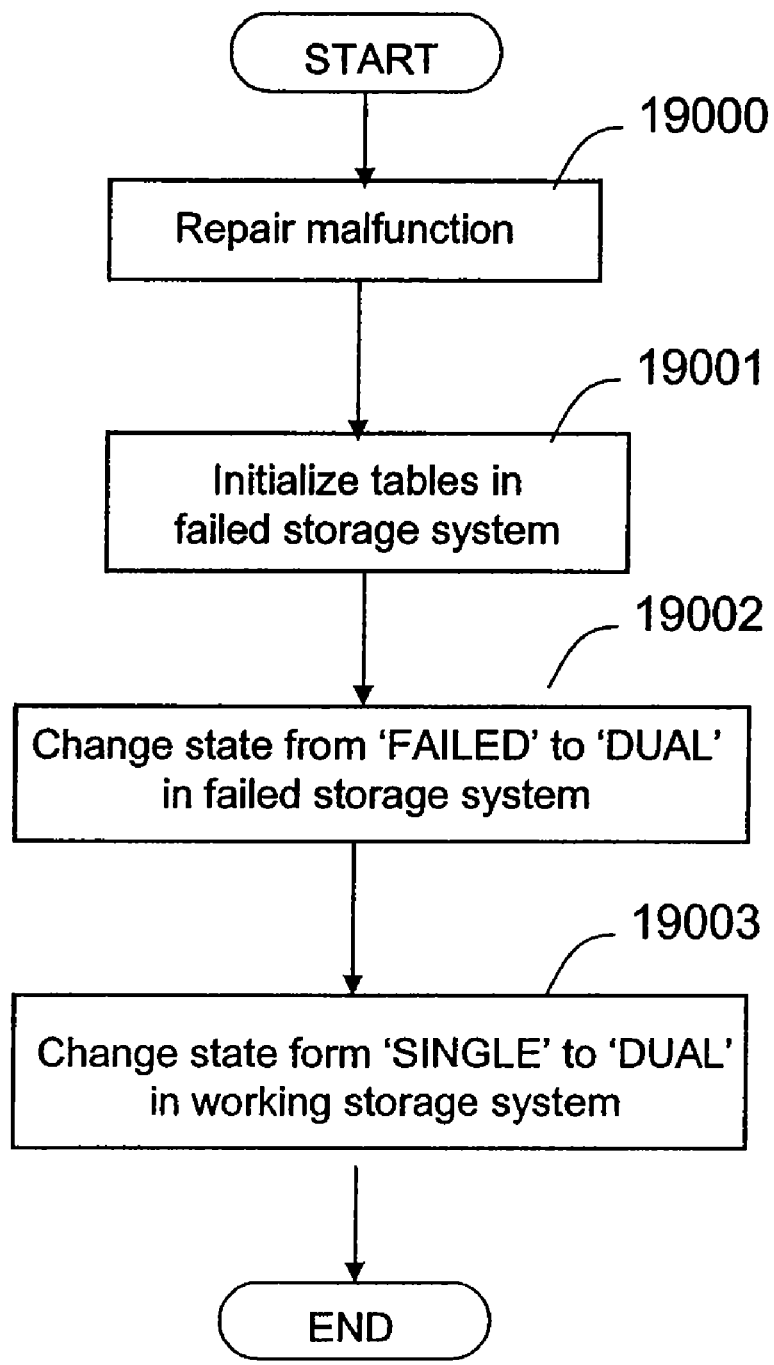
FIG. 19 illustrates a process for recovering from the state FAILED to DUAL according to one embodiment.

FIG. 19 illustrates a process for recovering from the state FAILED to DUAL according to one embodiment. First, the malfunction which caused the state FAILED is repaired (step 19000). If the system is repaired, the tables in failed storage system are initialized (step 19001) and the state is changed to DUAL (step 19002). The state in the other storage system is changed to SINGLE to DUAL (step 19003).

Figure 20:
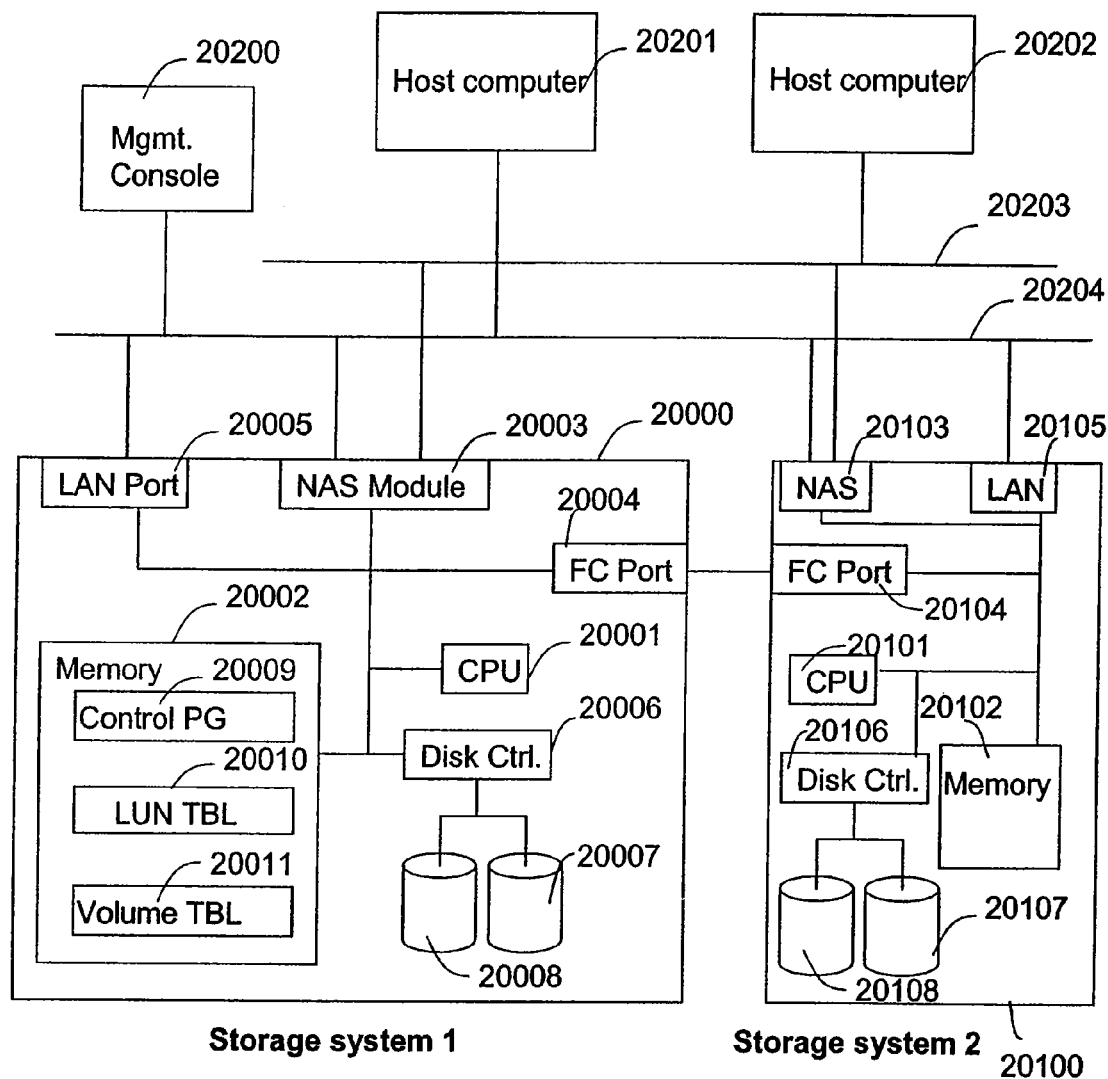
FIG. 20 illustrates a clustered storage system having a plurality of platform storage systems that have Network Attached Storage (NAS) modules according to one embodiment of the present invention.

FIG. 20 illustrates a clustered storage system having a plurality of platform storage systems that have Network Attached Storage (NAS) modules according to one embodiment of the present invention. In this embodiment, platform storage systems has NAS modules that export file system to the host computer through a LAN. If a NAS module in one platform storage system fails, the file systems which are provided by the failed module can be accessed through another platform storage system's NAS module. Each platform storage system works as a platform storage system and the other's external storage system.

A storage system 20000 has NAS module 20003 which is connected LANs 20203 and 20204. Host computers 20201 and 20202 are connected to NAS modules in the storage systems through LANs 20203 and 20204. A management console 20200 is connected to the LANs. Two storage systems 20000 and 20100 are connected through FC ports 20004 and 20104 in order to discover the other's internal volumes as external volumes. A memory 20002 includes a control program 20009, LUN table 20010, and volume table 20011. A CPU 20001, disk controller 20006, and disk devices 20007 and 20008 are provided within the storage system.

Similarly, a storage system 20100 includes a NAS module 20103, a LAN port 20105, a FC port 20104, a CPU 20101, a disk controller 20106, a memory 20102, and disk devices 20107 and 20108.

Figure 21:
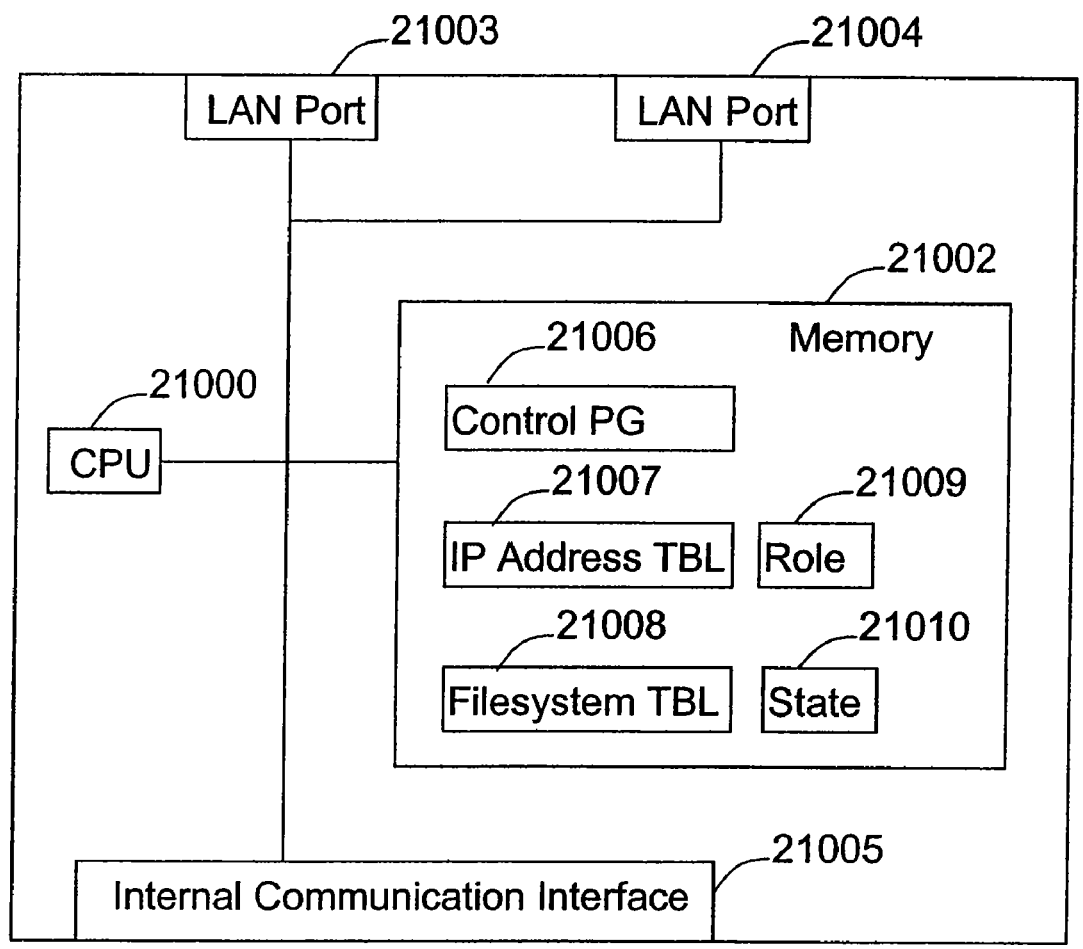
FIG. 21 illustrates a detailed view of the NAS module according to one embodiment of the present invention.

FIG. 21 illustrates a detailed view of the NAS module according to one embodiment of the present invention. It has a plurality of LAN ports 21003 and 21004 to communicate with the host computers and the other storage system's NAS module. Each storage systems generally checks whether or not the other side is alive or not by sending heartbeats and receiving acknowledgement. Memory 21002 contains a control program 21006, IP address table 21007, file system table 21008, role variable 21009, and state variable 21010. To send/receive data to/from disk volumes, it has an internal communication interface 21005. Through this interface, the control program discovers and accesses disk volumes.

FIG. 22 illustrates a more detailed view of IP address table 21007 according to one embodiment of the present invention. A column 22000 indicates the LAN port. A column 22002 indicates the IP address of the assigned port. A column 22003 indicates a standby IP address. Heartbeats are sent between IP address and standby IP address stored in column 22002 and 22003 respectively to check whether the remote NAS module is alive. If a NAS module detects a failure of remote NAS module, it takes over the standby IP address, that is, IP address of remote NAS module.

FIG. 23 illustrates the structure of file system table 21008 according to one embodiment of the present invention. A column 23001 indicates volume ID which is assigned by the control program in the local platform storage system. A column 23002 indicates whether a given volume is an internal or external volume. A column 23003 indicates whether or not the volume is mounted.

When an administrator initializes the system illustrated in FIG. 20, LUN table 20010 is configured to export internal volumes through FC port 2004. The internal disk volumes in the remote storage system are discovered through the FC port and recorded as external volume in volume table 20011. The NAS module mounts and exports only internal volumes. When there is no failure, the host computer can access the internal volumes of both of these storage systems via respective NAS module. The process to read and write data is similar to normal NAS.

Figure 24:
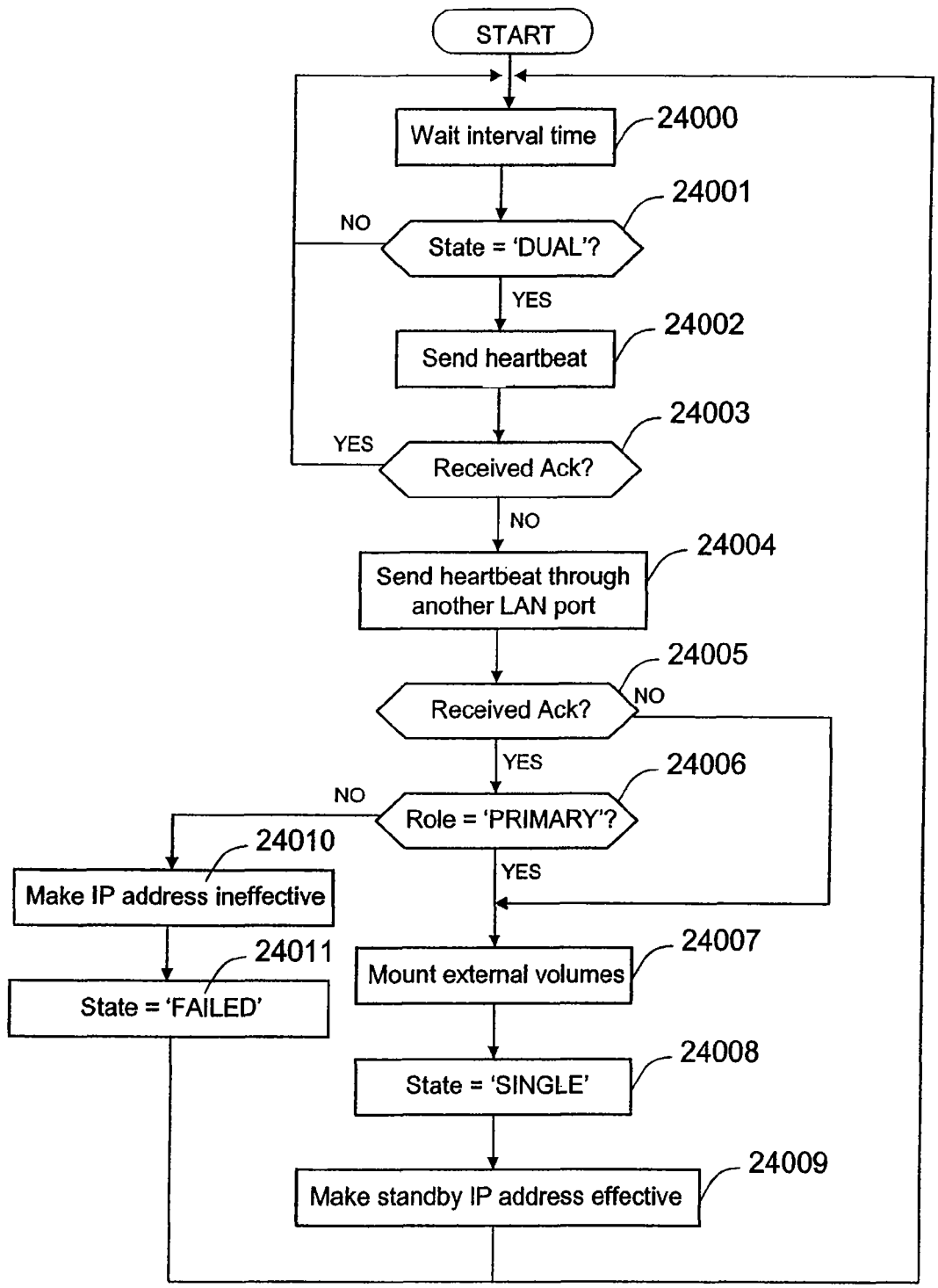
FIG. 24 illustrates process of heartbeat and failover performed according to one embodiment of the present invention.

FIG. 24 illustrates process of heartbeat and failover performed according to one embodiment of the present invention. The control program waits for a given interval (step 24000) since a heartbeat is sent to the remote storage system at specified intervals. If the state is not DUAL, the heartbeat it is not sent (step 24001) since the remote storage system is in FAILED state. If it is DUAL, the heartbeat is sent (step 24002). The control program waits to receive an acknowledgement (step 24003) that the remote storage system is alive. If acknowledgement is received, the process returns to step 24000.

Otherwise, the control program sends a heartbeat through another LAN port (step 24004). If the acknowledge is still not received, it mounts external volumes (step 24007), changes the state to SINGLE (step 24008), and makes the standby IP address effective in addition to the existing IP address since the remote storage system is deemed not to be alive (step 24009). As a result of step 24009, local NAS module can receive packets which are sent from host computers to the failed remote NAS module. At step 24006, if the role of the storage system is not primary, the process proceeds to step 24010. The primary storage system continues to work and but the secondary storage system stops working, that is, the control program makes the IP address ineffective (step 24010). The state is changed to FAILED (step 24011).

Figure 25:
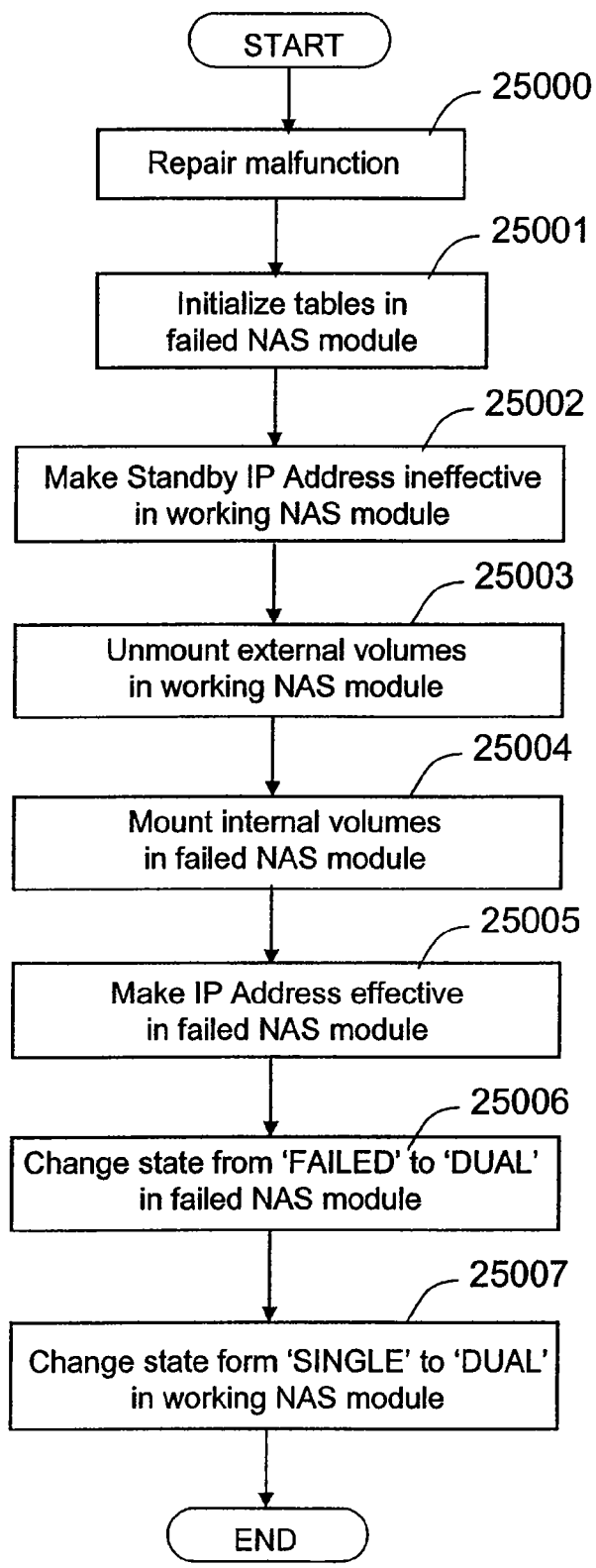
FIG. 25 illustrates a process for recovery from state FAILED to DUAL according to one embodiment of the present invention.

FIG. 25 illustrates a process for recovery from state FAILED to DUAL according to one embodiment of the present invention. First, the malfunction which caused the state FAILED is repaired (step 25000). If the system is repaired, the tables in the failed NAS module are initialized (step 25001). All volumes are not mounted at this time. An administrator instructs the operating NAS module to make standby IP address ineffective (step 25002) and unmount external volumes (step 25003). Next, the administrator instructs the failed NAS module to mount the internal volumes (step 25004) and make IP address effective (step 25005). The states in the failed and operating storage system are changed to DUAL (steps 25006 and 25007). In the present embodiment, the host computer can continue to access to file systems which are exported by the failed NAS module, through the other storage system's NAS module.

The present invention has been described in terms of specific embodiments to describe the invention and enable those skilled in the art to practice the invention. The embodiments described above may be modified or altered without departing from the scope of the invention. The scope of the invention should be interpreted using the scope of the appended claims.

What is claimed is:

1. A data storage system comprising:
a first system including a first network interface to communicate with a host computer, a first storage controller, a first cache table, and a first memory to store a first control program to process an input/output (I/0) request received by the first system;
a second system including a second network interface to communicate with the host computer, a second storage controller, a second cache table, and a second memory to store a second control program to process an I/0 request received by the second system;
an external storage system coupled to the first and second systems, the external storage system including a first storage unit to provide storage volumes and a third storage controller to control the first storage unit, wherein the first and second systems are configured to present the storage volumes of the external storage system to the host computer, wherein each of the first and second cache tables includes state information for each cache entry indicating state of cached data, and wherein said state information of said cache table is informed to said second cache table wherein each of the first and second cache tables further includes address information, and cached data, wherein the state information indicates whether or not a given cached data is CLEAN or DIRTY, wherein CLEAN indicates that the cached data and data stored in a storage volume corresponding to the address information are the same, and wherein DIRTY indicates that the cached data and the data stored in the storage volume corresponding to the address information are different.

2. The storage system of claim 1,
wherein the first system further includes a second storage unit, and the second system further includes a third storage unit, and
wherein each of the first, second and third storage units comprises a plurality of disk drives.

3. The storage system of claim 1, wherein information of the first cache table is coherent with information of the second cache table.

4. The storage system of claim 1,
wherein after data is destaged to said first storage unit by the first system, said first system sends notice to said second system so that corresponding cache block is released for said second cache table.

5. The storage system of claim 1 wherein said first controller sends to said second controller a first instruction o change state information, wherein in response to said second controller receiving said first instruction, said cached data and data stored in the storage volume corresponding to the address information are the same and the state information is changed to CLEAN.

6. The storage system of claim 5,
wherein said first controller sends to said second controller said first instruction in response to a change of Dirty to Clean of said state information for said first cache table.

7. The storage system of claim 6,
wherein said first instruction includes an identifier that identifies data stored in said first storage unit.

8. The storage system of claim 7,
wherein said identifier includes storage volume identifier and LBA (Logical Block Address) of the data stored in said first storage unit.

9. The storage system of claim 1,
wherein data stored in said storage volumes of said external storage system via said first system can be accessed by the host computer via said second system.

10. The storage system of claim 1,
wherein the first system has a first processor, the second system has a second processor, and the external storage system has a third processor and a third memory.

* * * * *